(12) United States Patent
Hahn et al.

(10) Patent No.: US 9,087,120 B2
(45) Date of Patent: Jul. 21, 2015

(54) DEVELOPMENT TOOLING ENABLEMENT FOR AUDIT EVENT GENERATION

(75) Inventors: Timothy J. Hahn, Cary, NC (US); Heather M. Hinton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 13/617,461

(22) Filed: Sep. 14, 2012

(65) Prior Publication Data
US 2013/0019226 A1 Jan. 17, 2013

Related U.S. Application Data

(63) Continuation of application No. 12/198,606, filed on Aug. 26, 2008, now Pat. No. 8,370,796.

(51) Int. Cl.
*G06F 9/44* (2006.01)
*G06F 11/30* (2006.01)
*G06F 11/36* (2006.01)

(52) U.S. Cl.
CPC .............. *G06F 11/3065* (2013.01); *G06F 8/70* (2013.01); *G06F 11/302* (2013.01); *G06F 11/3612* (2013.01); *G06F 11/3692* (2013.01)

(58) Field of Classification Search
None
See application file for complete search history.

(56) References Cited

U.S. PATENT DOCUMENTS

| 5,574,898 A * | 11/1996 | Leblang et al. ........ 707/999.001 |
| 6,182,246 B1 | 1/2001 | Gregory et al. |
| 2010/0058291 A1 | 3/2010 | Hahn et al. |

OTHER PUBLICATIONS

U.S. Appl. No. 12/198,606, 2 pages.
Abbott, Jonathon et al., "Automated Recognition of Event Scenarios for Digital Forensics", ACM, SAC'06, Apr. 23-27, 2006, pp. 293-300.
Clarke, Lori A. et al., "A Historical Perspective on Runtime Assertion Checking in Software Development", ACM SIGSOFT Software Engineering Notes, vol. 31, No. 3, May 2006, pp. 25-37.
Dragoi, G et al., "An Internet based quality tool for customers to improve product development", Recent Advances in Integrated Design and Manufacturing in Mechanical Engineering, 4th International Conference on Integrated Design and Manufacturing in Mechanical Engineering, May 14-16, 2002, pp. 503-512.
Notice of Allowance mailed Sep. 27, 2012 for U.S. Appl. No. 12/198,606, 9 pages.
Chen, Hsiang-Hui et al., "Achieving Database Accountability and Traceability Using the Bitemporal Relation", IEEE, 2003, p. 151-156.

* cited by examiner

*Primary Examiner* — Qamrun Nahar
(74) *Attorney, Agent, or Firm* — Stephen J. Walder, Jr.; Jeffrey S. LaBaw

(57) ABSTRACT

Mechanisms for development tooling enablement of audit event generation are provided. The mechanisms automatically generate and insert compliance audit record generation code where appropriate in identified portions of program instructions based on established compliance policies and labels associated with keywords/library functions appearing in the source code. The mechanisms may analyze the program instructions to identify at least one portion of program instructions meeting a compliance policy requirement for generation of a compliance audit record. Compliance audit record generation code for generating the compliance audit record may be generated. The compliance audit record generation code may be inserted into the at least one portion of program instructions to generate modified program instructions. The modified program instructions may be output for execution on a computing device.

25 Claims, 5 Drawing Sheets

```
If (testUserExists(this.user)){ then UpdateUser(data...)

} else {

CreateNewUser(data...)

```
If (testUserExists(this.user)){
        //START MANDATORY COMPLIANCE CODE - Tool Added
        Compliance(Update, data,...)
        //END MANDATORY COMPLIANCE CODE - Tool Added //where the data may be simply the time stamp, event trail ID,
        invoking method/application and information such as the user
        ID that invoked this functionality UpdateUser(data...)

} else {
        //START MANDATORY COMPLIANCE CODE - Tool Added
        Compliance(CreateNew, data,...)
        //END MANDATORY COMPLIANCE CODE - Tool Added //where the data may be simply the time stamp, event trail ID,
        invoking method/application and information such as the user
        ID that invoked this functionality CreateNewUser(data...)

DEVELOPMENT TOOLING ENABLEMENT FOR AUDIT EVENT GENERATION

BACKGROUND OF THE INVENTION

1. Field of the Invention

The present application relates generally to an improved data processing apparatus, method, and computer program product. More specifically, the present application is directed to development tooling enablement for audit event generation.

2. Background of the Invention

Software development tooling environments are generally known in the art. Such software development tooling environments typically provide user interfaces through which a user may define and edit computer code for programs in one or more different computer programming languages. For example, the Eclipse™ software development tool, available from the Eclipse Project (available at www.eclipse.org), is one type of software development tooling environment which provides easy to use user interfaces through which a software developer may define and develop a software project, such as a portion of code, a program, an information technology (IT) system service, or the like.

Like Eclipse™, software development tools are typically provided as integrated development environments (IDEs). An IDE is a software application that provides comprehensive facilities to computer programs for software development. An IDE normally consists of a source code editor, a compiler and/or interpreter, build automation tools, and a debugger. Other tools that may be provided in an IDE include a version control system, a class browser, an object inspector, a class hierarchy diagram tool, and the like.

Because debugging has traditionally been an important part of software development, as mentioned above, the IDEs and other software development tooling environments typically provide mechanisms for introducing error logging code into the source code being developed. Such logging is strictly for "serviceability," i.e. allowing an application to be debugged or analyzed to determine reasons for abnormal behavior. Thus, the information that is logged typically is only targeted at information that may be indicative of a source of an error.

BRIEF SUMMARY OF THE INVENTION

In one illustrative embodiment, a method, in a data processing system, is provided for automatic generation and insertion of compliance audit record generation code in program instructions of an application. The method may comprise analyzing, by the data processing system, the program instructions to identify at least one portion of program instructions meeting a compliance policy requirement for generation of a compliance audit record. The method may further comprise generating, by the data processing system, compliance audit record generation code for generating the compliance audit record. Moreover, the method may comprise inserting, by the data processing system, the compliance audit record generation code into the at least one portion of program instructions to generate modified program instructions. The modified program instructions may be output for execution on a computing device.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B illustrate an example of an insertion of audit event record generation code in accordance with one illustrative embodiment.

DETAILED DESCRIPTION OF THE INVENTION

Figure 1:
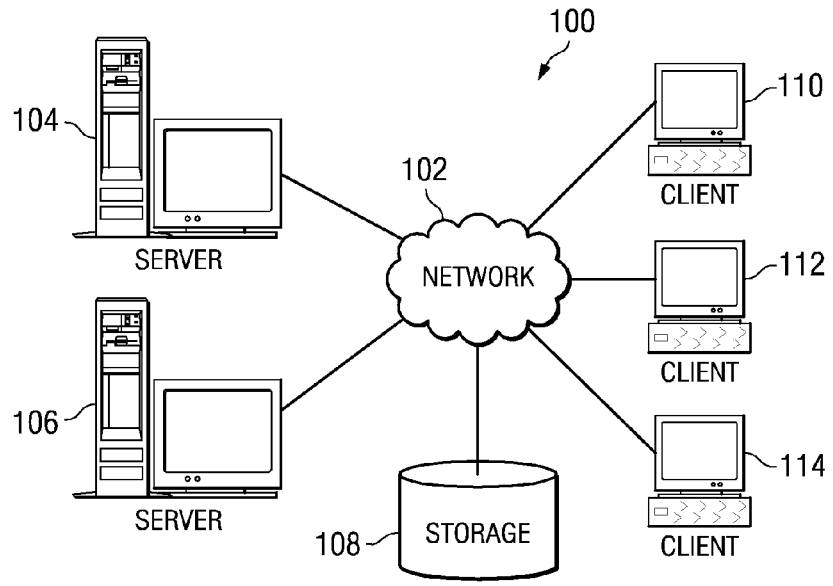
FIG. 1 is an exemplary block diagram of a distributed data processing environment in which exemplary aspects of the illustrative embodiments may be implemented.

Compliance, and reporting to demonstrate compliance, with security policies, governmental policies, business policies, etc., has become an important part of an enterprise's information technology environment. The information required in order to show such compliance is typically independent of the logging information produced by an application for debugging purposes. That is, applications are typically instrumented during the development process in order to generate debug logs storing information about whether the application itself is operating properly and, if not, the potential source of a problem causing the application to not operate properly. Compliance, on the other hand, may involve the application operating properly and yet an established policy is violated. In such a situation, debug information will provide no indication as to the potential source of the compliance failure.

As a result, additional information above and beyond that provided by application debugging logs is necessary for demonstrating compliance. This compliance information is necessary to generate reports that can demonstrate compliance and that can identify what actions caused a failure in compliance based on when/where/why/how/who information about an action resulting in a compliance failure.

Presently, if such compliance information is to be compiled into a compliance log, a human application developer must, as the application developer builds an application, be aware of compliance audit/logging requirements and develop applications that provide the required information to support the compliance reporting. This in turn requires that the human application developer have a detailed knowledge and understand the compliance information that is to be audited/logged so that the human application developer may properly enable his/her applications to generate and log such compliance information. The result is that, because of the limitations of human beings with regard to human error, key compliance information will often be missed and not included in audits/log information and thus, is not included in compliance reports. Thus, often the information that is generated is not sufficient to demonstrate compliance and is insufficient for answering the when/where/why/how/who compliance questions regarding an action resulting in a compliance failure.

The illustrative embodiments provide a mechanism for automatically generating audit event logging code during software development. The illustrative embodiments provide automatic audit event logging code via the software development tooling environment, such as by integration into the original software development tooling environment itself, plugging-in of an audit event logging plug-in module to an existing software development tooling environment, or the like. The automated audit event logging functionality of the illustrative embodiments utilizes metadata that identifies all of the various "actions" that may have audit requirements and associates labels with these various actions. These labels are then applied to keywords and standard library functions such that the keywords and standard library functions are tagged with the labels. A set of compliance policy rules may be developed based on these labels, actions, keywords, standard library functions, etc. such that audits of certain compliance data may be performed and, as a result, compliance information may be logged for use in generating compliance reports.

With these mechanisms having been developed and put into place, when a software developer is in the process of developing an application or portion of code, the software development environment will automatically check the code to determine if the keywords or standard library functions are being utilized in the code. If so, the labels associated with the keywords/functions may be retrieved and used, along with the keywords/functions, associated actions, etc. to determine whether and what audit data is to be collected into a compliance audit log. For example, the compliance policy rules may be applied to the particular combination of label, keyword/function, action, etc. to determine if audit data is to be collected and which types of audit data are to be collected, from which sources, etc. If it is determined that audit data should be collected, the software developer may be prompted with a request as to whether the software developer wants to include audit data generation code or the audit data generation code may be automatically inserted into the code without prompting the software developer.

Hence, the illustrative embodiments provide mechanisms for using metadata in the software development environment to control the automatic generation and insertion of audit logging points in the software code based on what that code is doing to the information and the type of that information. With the ability to determine when an audit log record should be created, the illustrative embodiments further provide the ability to analyze existing code to see if appropriate records are already being produced and, if not, either prompting a software developer for insertion of appropriate audit code or performing automatic insertion of appropriate audit code. In this way, a type of security analysis is performed on existing source code to ensure that proper audit information is being generated by the existing source code.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" and PL/I programming languages or similar programming languages. This also applies to business languages such as COBOL or EGL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
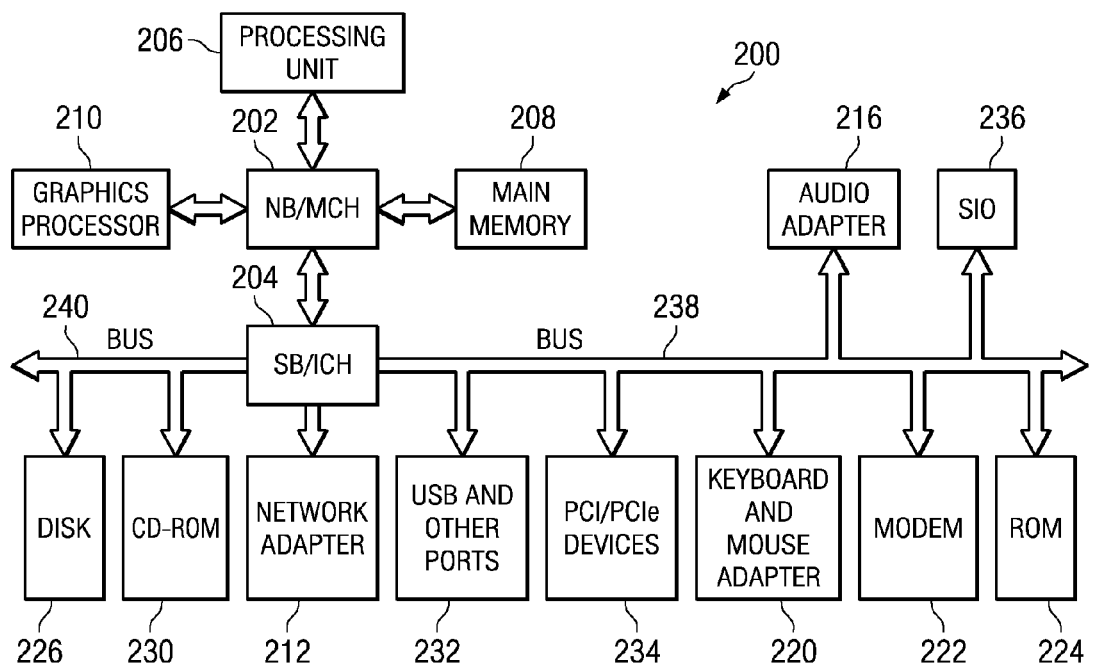
FIG. 2 is an exemplary block diagram of a data processing system in which exemplary aspects of the illustrative embodiments may be implemented.

In view of the above, it should be appreciated that the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as exemplary environments in which exemplary aspects of the illustrative embodiments may be implemented. While the description following FIGS. 1 and 2 will focus primarily on a distributed data processing device implementation of a software development environment, this is only exemplary and is not intended to state or imply any limitation with regard to the features of the present invention. To the contrary, the illustrative embodiments are intended to include single data processing environments and any other embodiments in which a software development environment is utilized to define, edit, and generate software source code.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed. Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, a user of a computing device, such as client computer 110, may access a software development environment made available by another computing device, such as server 106, in order to define and develop a software application, portion of source code, or the like. As is generally the case, many users of many computing devices, e.g., client devices 110-114, usually collaborate through such a software development environment to generate the software application, source code, etc. The resulting software application, source code, etc. may be compiled, linked, and otherwise processed to generate an executable code that may then be deployed or otherwise executed by a computing device in order to achieve a desired functionality.

The software development environment may include facilities for debugging the software application during development. Such debugging typically involves collection of debug or trace information and analysis to verify correct operation of a program to a program developer.

In accordance with one illustrative embodiment, the software development environment provided by the server 106 further implements an automated compliance audit record generation and logging functionality for automatically inserting audit record generation code into the source code where appropriate. The audit record generation code inserted by the software development environment of the illustrative embodiments, when executed, causes the executed code to collect and store necessary compliance information in a log for use in generating compliance reports demonstrating compliance or providing information regarding reasons for a failure in compliance with an established policy. Compliance information is information collected for the purpose of indicating to auditors and regulatory bodies that an organization is acting within the bounds of the rules to which it has declared that it will adhere, i.e. a compliance policy. Where debug, trace, and debugger-displayed information is used to help a developer of a program verify "correct operation" within the programming language semantics and that the program does what the programmer intends for it to do, compliance information is used to help an organization verify "correct operation" within the organization's agreed upon rules even in the presence of a properly operating program. Verifying compliance may include "usage as intended" even so far as to identify places where a developer may introduce code that is not in accordance with intended operation of the code, but is within the required operation with regard to compliance.

Since the software application code may be written before or after a policy for compliance is written, such violations cannot be prevented solely at code construction time. Thus, causing adequate audit records to be created for evaluation at or post-runtime allows for "late evaluation/comparison" to established compliance rules.

Further differences between the collection and use of compliance information and the collection and use of debug information include the fact that compliance information is for a different audience than debug information (auditors vs. developers) and is used at a different time than debug information (compliance evaluation rather than program debugging/analysis). Moreover, compliance information is application and user based, whereas debug logging information is runtime based. Debug, trace and debug information can all be turned on/off as required based on program operation (so if a problem needs to be diagnosed, more of this debug information is collected). However, compliance information is always collected, regardless of program operation and should not be turned off. Not having enough debug trace information makes it harder to debug a problem, but this can be remediated by increasing the logging level so that more information is collected the next time the problem occurs. Compliance information is collected continuously since it is not possible to "re-collect" it at a later date.

Moreover, debug/logging information describes what a program is (was) doing, includes memory stack dumps and traces, is related to a single application, may be turned on/off based on the software lifecycle, i.e. on during development, testing, and debugging, but off during production etc., and is dumped to a syslog/trace file which is typically overwritten or discarded on a relatively quick basis (e.g., daily or weekly) and so does not have a big retention requirement. Compliance information, on the other hand, is continually used and maintained for a long period of time, describes what a user is asking a program to do, e.g., how the program is being asked to modify/manipulate data, the compliance information data that is logged may be related to a policy such that data is worthy of logging in one use case but not another, is written to a long term repository and is typically archived, and is used with tools to combine with data from multiple applications to build a transaction view.

With the mechanisms of the illustrative embodiments, the software development environment identifies where such compliance information is to be collected and thus, where compliance information audit record generation code should be inserted into the source code. The illustrative embodiments may then automatically insert such compliance audit record generation code into the original source code of the software program. In some illustrative embodiments, the human software developer may be included in the process by prompting the software developer regarding whether such compliance audit record generation code should be inserted or not. Moreover, in some illustrative embodiments, the software development environment may analyze existing software applications, source code, etc. to determine if appropriate compliance audit records are being generated by the existing software applications, source code, etc. and if not, the human software developer may be notified and/or the compliance audit record generation code may be inserted into the existing source code of the application.

Figure 3:
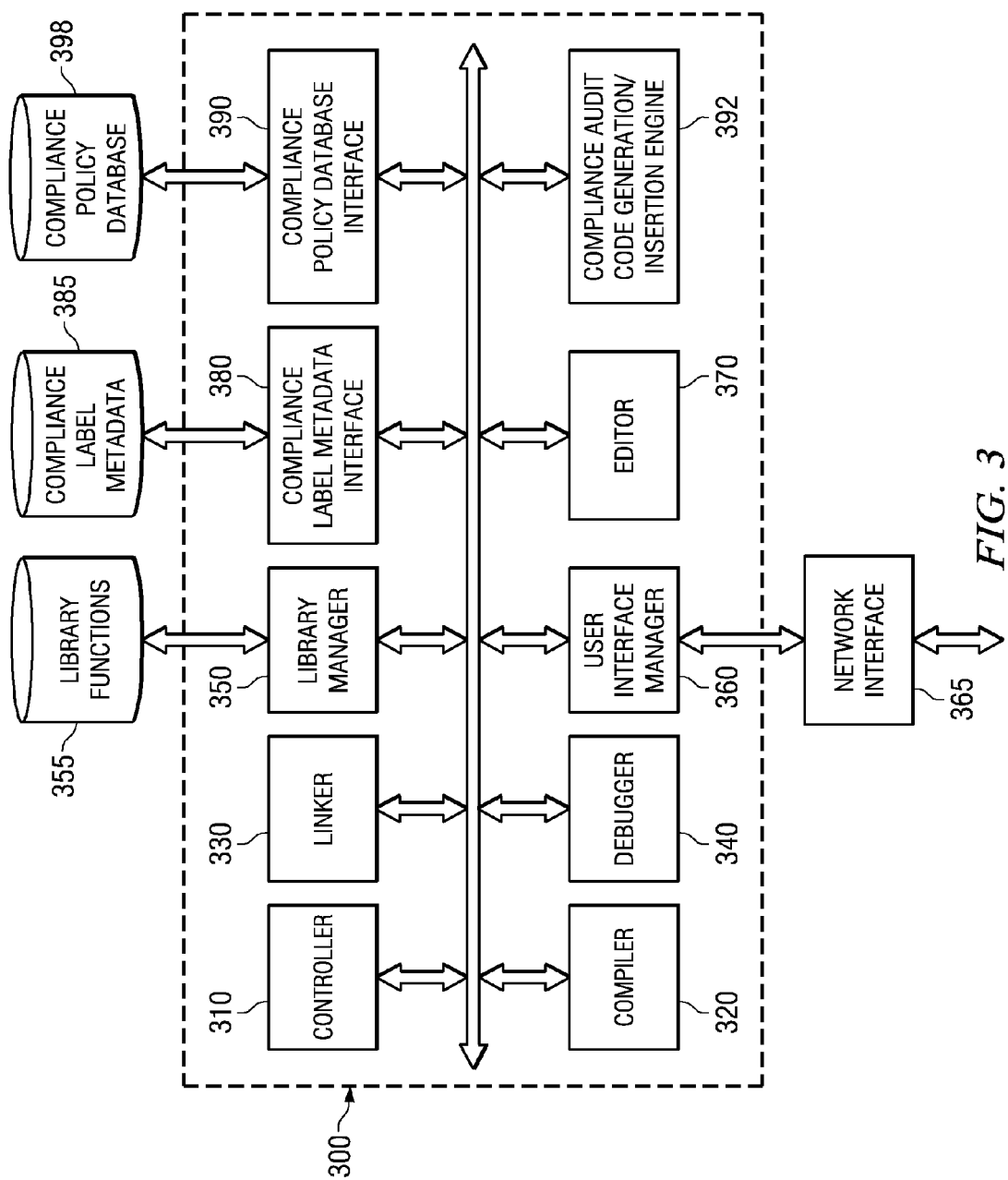
FIG. 3 is an exemplary block diagram of the primary operational components of a software development environment in accordance with one illustrative embodiment.

FIG. 3 is an exemplary block diagram of the primary operational components of a software development environment in accordance with one illustrative embodiment. The software development environment 300, in the depicted example, is an integrated development environment (IDE). As shown in FIG. 3, the software development environment 300 includes a controller 310, a compiler 320, a linker 330, a debugger 340, a library manager 350, a user interface manager 360, an editor 370, a compliance label metadata interface 380, a compliance policy database interface 390, and a compliance audit code generation/insertion engine 392.

The controller 310 controls the overall operation of the software development environment 300 and orchestrates the operation of the other elements 320-392. The compiler 320, linker 330, debugger 340, and library manager 350 are commonly recognized program development tools and thus, a more detailed discussion of these elements will not be provided herein. In addition, a program editor 370 is provided which is used as a processor for source code entry. The user interface manager 360 coordinates different views on program artifacts such as source views, project views, build/make file views, and the like. Moreover, as discussed in greater detail hereafter, the user interface manager 360 may provide a user interface for notifying a user of a potential compliance audit event for which compliance audit event record generation code may be inserted into source code.

The compliance label metadata interface 380 provides a communication interface through which compliance label metadata may be retrieved from the metadata database 385 and utilized. The compliance policy database interface 390 provides a communication interface through which compliance policy information may be retrieved from compliance policy database 395 and utilized. The compliance audit code generation/insertion engine 398 contains the primary logic for implementing the automated compliance audit event record generation code and inserting this code into the source code being developed in accordance with the illustrative embodiments described hereafter.

The compliance label metadata 385 stores metadata, e.g., keywords and corresponding labels, for "tagging" data elements, objects, and methods of the computer programs edited/authored using the software development environment 300 when generating source code. In addition, standard library functions available through the library manager 350 may also be tagged with labels stored in the compliance label metadata 385. The labels in the compliance label metadata 385 are a set of metadata identifying all of the types of actions that may have audit requirements on them. These labels are correlated in the compliance label metadata 385 with particular keywords that may be present in the source code for specifying variables, data elements, objects, methods, library functions, and the like. Thus, the tagging of the variables, data, objects, methods, and library functions essentially groups the keywords and/or library functions into groups of actions that are to be audited for compliance information.

For example, a first label of "modify" may be established for keywords/library functions associated with writing to databases, files, external data stores, or performing operations on data (i.e. changing data). As one example, the "=" assignment operation may constitute a modification of the item to the left of the "=" keyword.

Other labels may be established for other types of keywords/library functions based on the actions associated with these keywords/library functions. For example, a "disclose" label may be associated with keywords/library functions having to do with reading or communication of data, i.e. disclosing data. A "communication" label may be associated with keywords/library functions having to do with communications received/issued (before or after processing). A "protection" label may be associated with keywords/library functions having to do with information that is signed/encrypted (before or after processing). A "validation" label may be associated with keywords/library functions having to do with information that is validated/decrypted (before or after processing). Other labels may be established for other desired groups of actions for which compliance audit event records are most likely required in order to provide sufficient compliance information for generation of compliance reports demonstrating compliance of the system in which the software application is executing with established policies or providing sufficient information for identifying a reason for a failure in compliance with such policies.

These labels may be associated with sets of keywords/library functions for the particular programming language(s) supported by the software development environment 300. These labels may be defined as a not-necessarily-proper subset of the programming language keywords/standard library functions. That is, the labels may indicate a subset of the items found in the source code or may contain other items/labels as well. Hence, the labels may be a subset of what is found in the source code as well as additional items that are found in other source code. In this way, the full set of labels intersects with the set of labels in the source code but is not a proper subset. Thus, for example, keywords/library functions such as fopen, put, encrypt, sign, etc., may be associated with one or more of the established labels. The particular labels in the compliance label metadata 385 may be specific to the particular software development project that is being worked on or may be more general in nature such that the labels are used for a plurality or all projects developed using the software development environment 300. For example, if the labels are defined on a "per project" basis, i.e. there are potentially different sets of labels for different projects, then in one project the fopen keyword may be tagged as a "modify" action while in another project, the fopen keyword may be tagged as a "communication" action, for example.

The labels defining different sets of keywords/library functions associated with different types of actions performed by operations associated with the keywords/library functions may be referred to herein as action labels. These action labels may be associated with individual keywords and library functions invoked by a portion of source code, an object of an object model, or the like. Thus, in an object oriented programming environment, objects within an object model may have one or multiple action labels associated with the keywords/library functions utilized by the code associated with the objects.

In addition to the action labels discussed above, further labels may be established for defining a type of object and an adjective label defining an audit sensitivity or audit trigger level of the object in the object model of the software application being developed. For example, a type label of "PII", or an adjective label of "sensitive," may be associated with objects within a model generated using the editor 370 of the software development environment 300. The type and adjective labels may be associated with the objects when the object model is initially created or may be added to object models of existing or legacy source code through a reverse engineering approach and analysis. The actual correspondence between a particular object and a type or adjective label may be established by characteristics of the objects and an associated rule set for each type or adjective label. For example, if an object invokes certain methods that have been determined to be "sensitive" in nature, then a "sensitive" adjective label may be associated with the object. Similarly, if the object invokes methods associated with a particular PII project, then a "PII" type label may be associated with the object. As noted above, a single object may have multiple different labels of different categories, e.g., multiple action labels, multiple type labels, and multiple adjective labels.

The particular labels associated with an object may be generated by the same tooling as is used for the overall software development environment. For example, one may have a person object with attributes of name, address, and Social Security Number (SSN). The address attribute, in turn, may be a complex object that contains number, street, city, state, and zip code. The address object in its entirety may be considered to be "PII" and thus sensitive if it is modified, however the zip code on its own may not be PII. Likewise, in the person object, an SSN may be marked as always PII and thus always worthy of auditing and the person object as a whole would have a PII label, but the first name used all by its self may not have a PII label.

It should be noted that assigning of the labels (PII, audit if X, etc.) can be done by a different person than the programmer based on the object model. Thus, the programmer is not required to identify the variables that are to be logged and passed to the audit logging utility.

As source code is being edited, or objects in an object model are being created in an object-oriented programming environment, using the editor 370 the source code or objects are analyzed by the compliance audit record code generation/insertion engine 398 based on the labels in the compliance label metadata 385 and the established policies in the compliance policy database 395. These policies may take many different forms but are essentially a set of rules indicating when audit record generation code should be present in the source code/objects in order to ensure proper generation of compliance records in a compliance log. The policies may further indicate the types of compliance information that should be included in the compliance records in order to ensure that adequate compliance information for demonstrating compliance is collected and/or to ensure that adequate compliance information is collected for identifying a reason for non-compliance.

For example, the policies in the compliance policy database 395 may be of the form "Always audit data with adjective keywords/functions 'X'" or "Always audit data associated with action keywords/functions 'Y'". Still further, more complex rules, such as "Audit actions associated with adjective 'A' and action 'B'", may be included in such policies. Rules such as these may be used to automatically add compliance audit record generation code in portions of source code or in objects that meet the criteria set forth in the policies as determined by the labels associated with the portions of the source code or the objects.

Thus, for example, when a user is writing source code in the software development environment 300, any usage of an appropriately tagged keyword/library function in the source code may be detected by the compliance audit code generation/insertion engine 398 and may give rise to a dialog or other user interface element being generated via the user interface manager 360 that provides information about the tagged command, the policy that applies, a sensitivity level of the tagged keyword/library function, etc. and indicates that compliance audit record generation code should be associated with the keyword/library function. A user's input to the user interface element may be received via the user interface manager 360 and provided to the compliance audit code generation/insertion engine 398. If the user's input indicates that compliance audit code is to be generated and inserted, the corresponding compliance audit code is generated and inserted based on the particular compliance data to be collected as indicated in the corresponding policy giving rise to the dialog or user interface element being generated. Alternatively, a generic compliance audit code may be generated and inserted. If the user indicates that compliance audit code should not be generated and inserted, such code may not be generated. A notification of this violation of established policies may be sent to a higher level architect or other user with a higher position than the software developer in order to make sure that those persons are aware of a deviation from the established policy in case corrective action needs to be taken. For example, such notifications may be sent to a supervisor or team lead by way of an e-mail notification, automatic opening of a defect in a problem management database, an automated call to a mobile telephone, an automated text message being sent to a mobile telephone or other mobile communication equipment capable of text messaging, or the like. The information that may be sent in such a notification may include, for example, the time, place, developer (person), source code file and line number, etc. associated with the violation of the established policy.

Alternatively, rather than prompting the user regarding whether or not to generate and insert compliance audit record generation code, such compliance audit record generation code may be automatically generated and inserted without asking the user. A combination approach may also be used in which some portions of code that meet policy requirements may have a user prompt, such as a dialog or other user interface element, generated to request the user identify whether to generate and insert the compliance audit record generation code while other portions of code may have this compliance audit record generation code automatically generated and inserted. For example, portions of code having an adjective label indicating that the portion of code has a particular sensitivity level or security level, e.g., "sensitive", may have the compliance audit record generation code automatically generated and inserted without requesting authorization from the user whereas other less "sensitive" portions of code may result in a user prompt being generated.

As an example in which both user prompts and automatic insertion of compliance audit record generation code is utilized, consider an embodiment in which the software development environment 300 automatically inserts a sub-routine/method to the source code that includes compliance audit record generation code, however the user may be prompted to add the appropriate variables for the sub-routine/method call. For example, the software development environment 300 may automatically insert code to call an audit log utility with identified variables such as a thread id, event trail id, time, action (e.g., invoking method/application), target id, etc. so that an audit log may be generated that identifies the following information, for example:

Who: Kevin Trillium
What: Modified ACL for group "contractors" from ACL=r to ACL=rwx
When: 2007-08-09 11:59:10
Why: (prompt the user to provide a justification for their action that gets reported as part of this compliance audit log)
How: Access Manager management functionality
Event Trail ID: 14FG1032
Run As: Administrator where the audit data itself is generated in a fashion consistent with the application's deployed environment, meaning that the log format may be consistent with W5, W7, WEF, CBE, etc.

Moreover, as part of the prompting of the user, the user may be further prompted to provide basic characteristics of the compliance information that is to be collected with regard to the compliance audit record generation code. That is, the user identifies what types of information should be gathered and then the engine generates code that automatically collects this data of interest.

As part of the generation and insertion of the compliance audit record generation code, the engine 398 ensures the creation of all required compliance audit record information such as "who, what, when, how, why" etc. For example, as shown above, the "who" information may include a user id associated with a thread that invokes the portion of source code. The "what" information may involve an identifier of an action performed that causes the portion of source code to be invoked. The "when" information may include a timestamp or other temporal information regarding the action that caused the portion of source code to be invoked. The "how" information may be operations/methods being used at this point in the code. The "why" information may be obtained from the user as an explanation as to why the user, identified in the "who" information, is performing the action identified in the "what" information. Additional compliance audit information may be gathered by the inserted compliance audit record generation code including such information as event trail identifiers, as shown above, that allow a complete event trail to be built up of all of the actions sequentially taken by a particular transaction. For example, the event trail identifiers may identify a trace-back of the call-tree (which function called which function to get to this point in the source code) showing how this method was invoked.

Event trail IDs are unique variables assigned to an E2E transaction which may in turn be made up of multiple events at multiple applications, spanning multiple threads and so on. Automatically including an event trail ID (or a less granular ID, eg, an application specific one that can be tied to an event trail ID) as part of the audit log generated will allow for a compliance report to be built across multiple applications for a given transaction and it is guaranteed that this information will be accurately and consistently generated for all applications that are instrumented with the approach of the illustrative embodiments. This allows a compliance posture to be related back to an owning "transaction" and not just the actions of a particular application. Thus, as a further difference between the illustrative embodiments and general debug information gathering, which is only applicable to the single application's runtime operation, the illustrative embodiments are applicable to the collection of compliance information during the runtime invocation of multiple applications as part of an overall transaction initiated, for example, by a user.

It should be appreciated that while the above illustrative embodiments assume that the analysis, generation of notifications, and generation/insertion of compliance audit record generation code are performed dynamically as source code, objects, etc. are being created, the present invention is not limited to such. Rather, or in addition to the above, the engine 398 may further analyze existing or legacy code to determine if compliance audit record generation code already exists in areas where it is needed and if not, notifications may be generated and the compliance audit record generation code may be generated and inserted where appropriate. That is, in a similar manner as discussed above, the existing code may be scanned to identify portions of code that meet requirements of established compliance policies as determined by the labels associated with keywords/library functions, type labels of objects, and adjective labels of objects. The identified portions of code may then have notifications generated for output to a user such that the user may decide whether to insert appropriate compliance audit record generation code or not and what compliance information should be collected. In addition, or alternatively, certain ones or all of the portions of code meeting compliance policy requirements may have the associated compliance audit record generation code automatically generated and inserted without prompting or notifying the user. Also helps when policy is changed after the code is written—the source code can then be re-evaluated and new points of audit added and old points of audit which are no longer necessary may be removed.

Regardless of which of the illustrative embodiments discussed above is used, the resulting source code that is generated based on the insertion of compliance audit record generation code may be provided to the compiler 320 and linker 330 for generation of executable code. The executable code may then be output for deployment or execution on a computing device. Of course, prior to deployment or execution in a runtime environment, the debugger 340 may be used to debug the source code in a manner generally known in the art.

Thus, analysis of source code, objects, etc. to identify portions of code where compliance audit code should be included is performed automatically by the mechanisms of the illustrative embodiments. In addition notifications of the need for compliance audit record generation code may be automatically generated. Moreover, the compliance audit record generation code itself may be automatically generated and inserted in an appropriate location within the source code for generating the compliance audit record in the compliance log. This compliance log may then be used as a basis for generating compliance reports to either demonstrate compliance with established policies or to identify a potential source or reason for non-compliance with the established policies.

Figure 4:
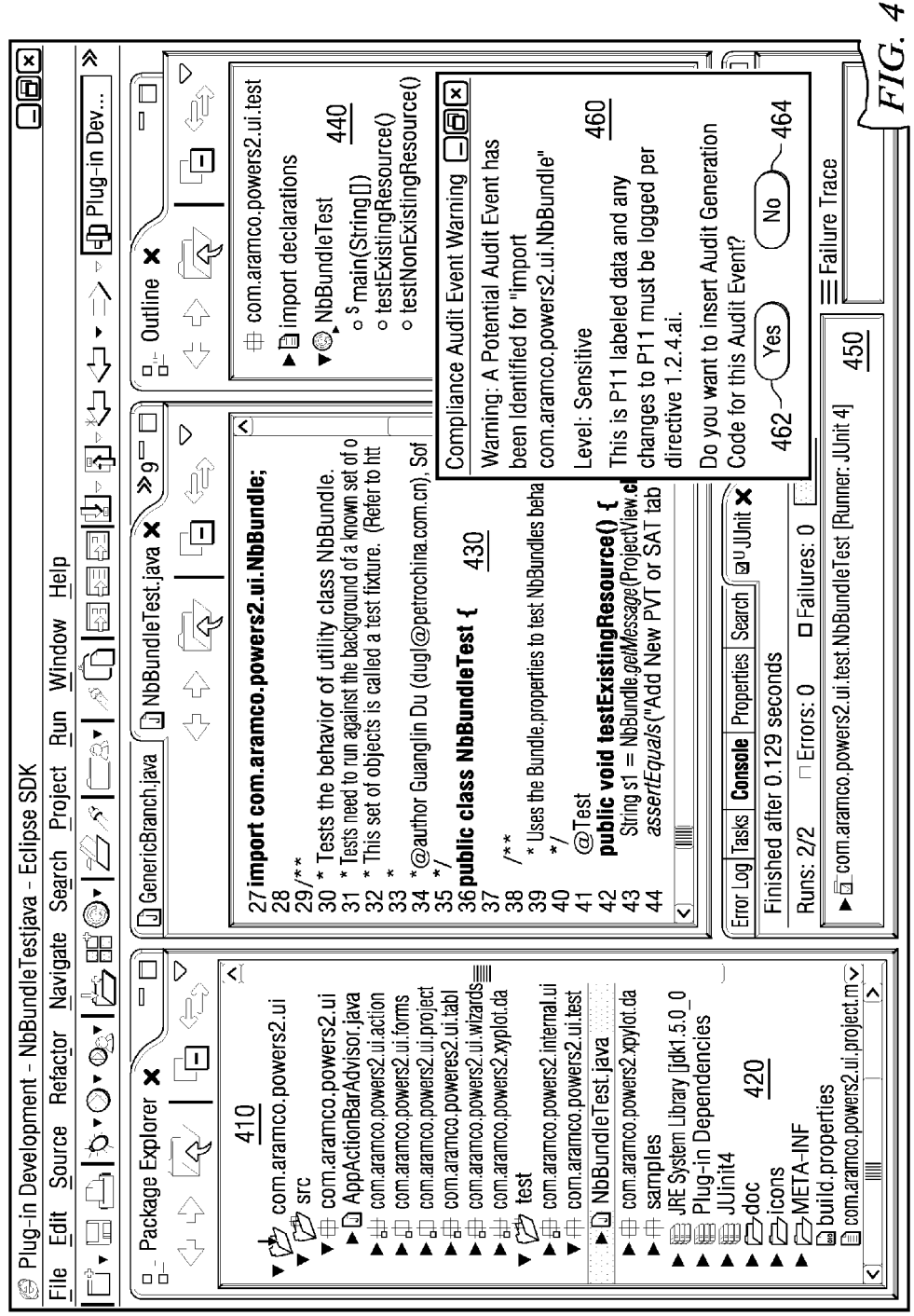
FIG. 4 is an exemplary diagram of a software development environment graphical user interface in accordance with one illustrative embodiment.

FIG. 4 is an exemplary diagram of a software development environment graphical user interface in accordance with one illustrative embodiment. As shown in FIG. 4, the software development environment graphical user interface 400 includes a plurality of views 410-450 of various aspects of the project. The example shown in FIG. 4 uses views from the Eclipse™ IDE available from www.eclipse.org. The various views 410-450 are generally known in the art and thus, a more detailed description of each view is not provided herein.

In addition to these various views, in accordance with the mechanisms of one illustrative embodiment, a notification or warning dialog or other user interface element 460. The notification dialog 460 includes a statement providing information about the audit event that gave rise to the generation of the notification dialog 460. In this case, through application of compliance policies to the labels associated with the keywords/library functions in the "import com.aramco.powers2.ui.NbBundle" statement in the source code, a potential audit event is detected. Based on adjective labels associated with this statement, a determination is made that the level of sensitivity of this audit event is "sensitive" and this level is reported in the notification dialog 460. Furthermore, based on the type labels associated with the statement, an explanation of the reason for the notification is provided indicating, in this case, that the data associated with com.aramco.powers2.ui.NbBundle is PII labeled data and that there is a directive that changes to PII data must be logged.

The notification dialog 460 further includes a request or prompt asking that the user indicate whether compliance audit record generation code should be generated and inserted for this audit event. User selectable user interface elements 462 and 464 are provided for allowing a user to respond to the request or prompt by either indicating that the compliance audit record generation code is or is not to be generated and inserted. It should be appreciated that the notification dialog 460 shown in FIG. 4 is only exemplary of the possible types of notification dialogs or user interface elements that may be used with the mechanisms of the illustrative embodiments. Many modifications may be made without departing from the spirit and scope of the illustrative embodiments.

FIGS. 5A and 5B illustrate an example of an insertion of audit event record generation code in accordance with one illustrative embodiment. FIG. 5A represents original source code prior to transformation by the software development environment in accordance with the illustrative embodiments. FIG. 5B illustrates transformed code corresponding to the original source code of FIG. 5A which includes the compliance audit record generation code inserted by the mechanisms of the illustrative embodiments.

The original source code shown in FIG. 5A represents the code that may be entered by a programmer or other user when developing a software application, for example. Alternatively, the code may be pre-existing code that is imported into the software development environment and which is then analyzed in accordance with the illustrative embodiments. As shown in FIG. 5A, the portion of original source code involves an "if" condition for testing whether a particular users exists or not. If the user exists, then the user data is updated. If the user does not exist, then a new user is created.

During code generation via the software development environment, software development environment implementing the mechanisms of the illustrative embodiments, analyzes the code being edited. For example, using the compliance audit record code generation/insertion engine 398 of FIG. 3, based on the labels in the compliance label metadata 385 and the established policies in the compliance policy database 395, the audit record code generation/insertion engine 398 may identify portions of code matching established labels which are then correlated to established policies. Based on the labels and policies, compliance audit record code is automatically, or semi-automatically with user prompts, generated and inserted into appropriate portions of the code being edited.

For example, in the code depicted in FIG. 5A, it may be determined that the object this user is a sensitive object that is associated with the label PII. Based on the identification of the object this user having the label PII, the policy database 395 may be consulted to determine if the this user object with the label PII satisfies a policy requirement for generation of compliance audit records. For example, it may be determined that the policy "Always audit data with adjective keywords/functions 'PII'" exists and thus, compliance audit record code may need to be generated and inserted in the code being edited.

FIG. 5B illustrates the result of the generation and insertion of the compliance audit record code into the original source code being edited as shown in FIG. 5A. As shown in FIG. 5B, a call to the method compliance( ) is made in the generated compliance audit record code. The information passed to the compliance( ) method may include, for example, the time stamp, event trail ID, invoking method/application information, user ID that invoked the functionality, and the like. The compliance( ) method may then generate a compliance audit record in a log based on this information for later use.

In addition, it should be noted that with the insertion of the compliance audit record code, appropriate comments may be inserted as well to indicate the automatic insertion of the code by a compliance tool. In this way, the programmer or other user is informed of the reason and source of the code that is inserted. Thus, a programmer may be less likely to attempt to remove the code when informed that it is automatically added by a compliance tool and is mandatory in order to ensure compliance information is gathered for the software program. Moreover, the software development tool may be configured such that, if a user attempts to remove this code that is added by the compliance tool, the compliance tool may automatically re-insert the code, such as during a "save" operation or the like, so that it is essentially not possible for the developer to subvert the compliance system. This may be done with, or without, notification to the developer that such compliance audit report code is being re-inserted.

Figure 6:
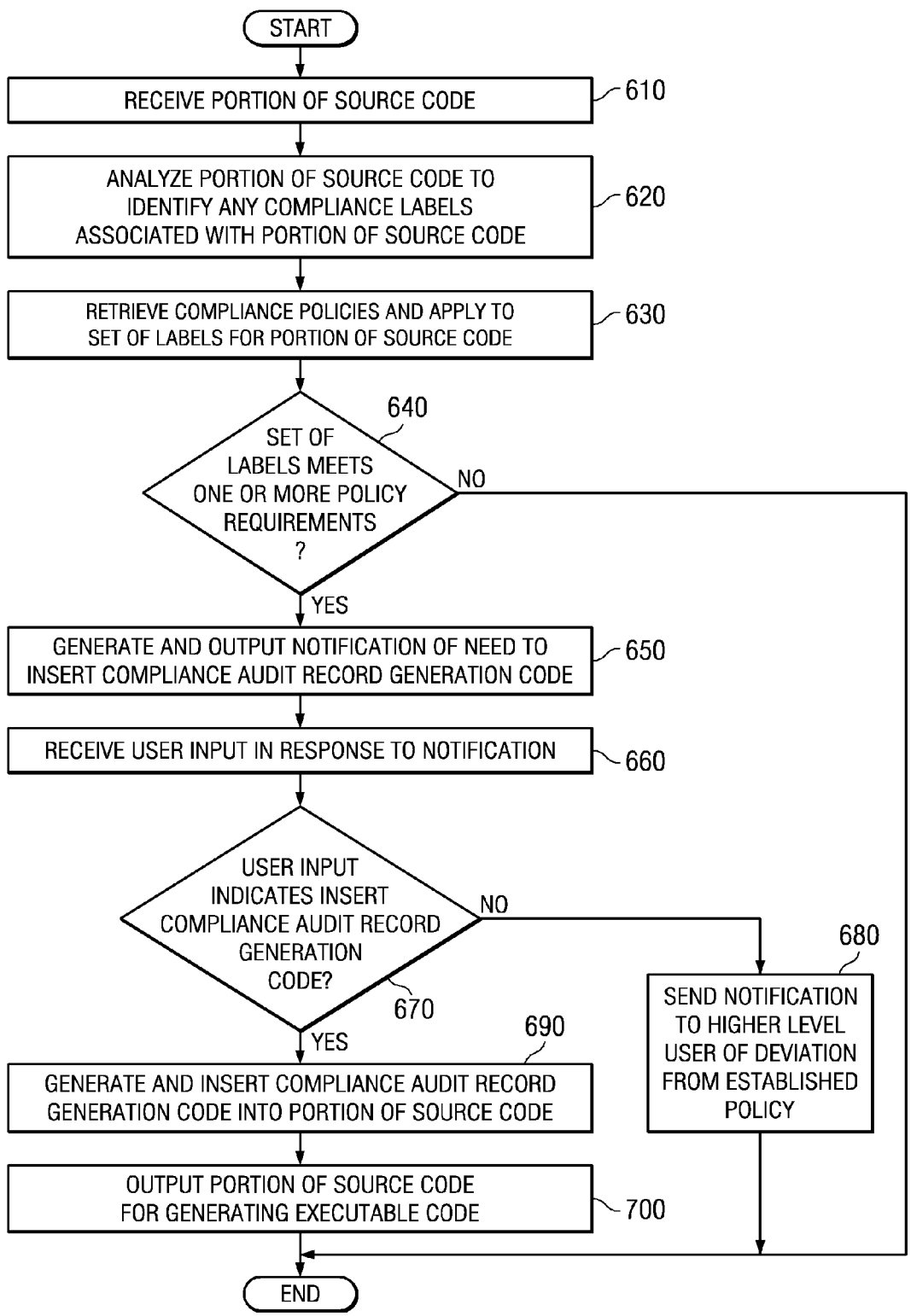
FIG. 6 is a flowchart outlining an exemplary operation of a software development environment in accordance with one illustrative embodiment.

FIG. 6 is a flowchart outlining an exemplary operation of a software development environment in accordance with one illustrative embodiment. As shown in FIG. 6, the operation starts with receiving a portion of source code (step 610). The portion of source code is analyzed to identify any labels associated with the portion of source code (step 620). For example, keywords, library functions, objects, etc., that are referenced in the portion of source code may be identified and the corresponding labels, if any, for these keywords, library functions, objects, etc. may be retrieved from a compliance labels metadata database. These labels may include action labels, type labels, adjective labels, and the like.

Having identified the labels associated with the portion of source code, established compliance policies are retrieved and applied to the set of labels for the portion of source code (step 630). A determination is made as to whether the set of labels for the portion of source code meet requirements of one or more of the compliance policies (step 640). If not, the operation terminates, but is repeated with the receipt of the next portion of source code. If at least one of the compliance policies has its requirements met by the set of labels for the portion of source code, then a notification of the need to generate and insert compliance audit record generation code is generated and output to a user (step 650). This notification may include a prompt requesting that the user indicate whether or not such compliance audit record generation code is to be generated and inserted into the source code.

A user input to the notification is received (step 660) and a determination is made as to whether the input indicates that such compliance audit record generation code is to be generated and inserted (step 670). If the user input indicates that such compliance audit record generation code is not to be generated and inserted, a warning notification may be sent to another higher level user indicating the deviation from the established compliance policy (step 680). If the user input indicates that such a compliance audit record generation code is to be generated and inserted, then the compliance audit record generation code is generated and inserted into a corresponding identified portion of the source code (step 690). As discussed above, this may involve obtaining information from the compliance policy database indicating what compliance information is to be gathered, obtaining input from the user as to what compliance information is to be gathered, using default or generic compliance information gathering code, or the like. Thereafter, the modified portion of source code may be output for use in generating an executable code for execution on a computing device (step 700). The operation then terminates but may be repeated with the input of a next portion of source code.

Thus, the illustrative embodiments provide mechanisms for automatically identifying portions of source code where compliance audit record generation code may be required. Moreover, the illustrative embodiments provide mechanisms for automatically notifying a user, such as a human software developer, of the need for the generation and insertion of such compliance audit record generation code. Furthermore, the illustrative embodiments provide mechanisms for automatically generating and inserting such compliance audit record generation code into an appropriate portion of the source code such that compliance information for demonstrating compliance with established policies, or reasons for non-compliance, may be automatically collected in response to the occurrence of a compliance audit event. These mechanisms alleviate the problems associated with known mechanisms which rely entirely on human knowledge and human intervention in adding compliance audit record generation code to source code.

It should be appreciated that, while the illustrative embodiments outlined above are directed to the tagging and analysis of tags in source code of an application, the present invention is not limited to such. Rather, in an alternative embodiment, elements within the source code may be tagged as described above and these tags may be preserved in a compiled version of the source code, i.e. the executable code. Thus, the analysis described above for determining if audit record generation code should be inserted into the source code may be used after compilation of the source code into an executable code such that code for generating the audit records may be inserted into the executable code following compilation. Of course, the audit record generating code may be a compiled subroutine or other portion of executable code that is either directly inserted or accessed by way of a function call, hook, or the like inserted into the executable code. It may be necessary to recompile the executable code following insertion of the audit record generation code in some implementations. Thus, the analysis and insertion mechanisms of the illustrative embodiments may be implemented in client or customer software product or other after software development product that utilizes the tags inserted as part of the software development environment, for example.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for automatic generation and insertion of compliance audit record generation code in program instructions of an application, comprising:

analyzing, by the data processing system, the program instructions to identify at least one portion of the program instructions matching a compliance policy requirement for generation of a compliance audit record;

generating, by the data processing system, compliance audit record generation code for generating the compliance audit record;

inserting, by the data processing system, the compliance audit record generation code into the at least one portion of program instructions to generate modified program instructions; and outputting the modified program instructions for execution on a computing device.

2. The method of claim 1, wherein analyzing the program instructions to identify at least one portion of program instructions meeting a compliance policy requirement comprises:

tagging one or more elements within the program instructions with corresponding compliance labels based on identifying elements in the program instructions that match compliance labels in a compliance label metadata database;

correlating the compliance labels with one or more policies in a policy database; and determining if compliance audit record generation code should be inserted into the at least one portion of program instructions based on the correlation of the compliance labels with the one or more policies in the policy database.

3. The method of claim 2, wherein the compliance labels specify an action group with which a group of element keywords are associated.

4. The method of claim 2, wherein the one or more elements include at least one of variables, data elements, objects, methods, or library functions.

5. The method of claim 2, wherein the compliance labels include labels that specify at least one of an audit sensitivity or a audit trigger level.

6. The method of claim 2, wherein inserting the compliance audit record generation code into the at least one portion of program instructions comprises:

prompting a user to confirm agreement with insertion of the compliance audit record generation code into the at least one portion of program instructions;

receiving user input in response to the prompt; and inserting the compliance audit record generation code into the at least one portion of program instructions if the user input indicates agreement of the user with the insertion of the compliance audit record generation code into the at least one portion of program instructions.

7. The method of claim 6, wherein prompting the user comprises displaying a graphical user interface specifying information about an element within the at least one portion of program instructions whose associated compliance label correlates with a policy in the policy database indicating that compliance audit record generation code should be inserted.

8. The method of claim 7, wherein the graphical user interface specifies information about the element, the policy, and a sensitivity level label associated with the element, and provides a user input interface through which a user may indicate agreement or non-agreement with the insertion of the compliance audit record generation code in the at least one portion of program instructions.

9. The method of claim 6, wherein if the user input indicates non-agreement with the insertion of the compliance audit record generation code into the at least one portion of program instructions, a notification of the user's non-agreement is generated and either transmitted to another user or is logged in a database.

10. The method of claim 1, further comprising:

receiving user input to remove the compliance audit record generation code from the modified program instructions; and upon occurrence of an event, automatically re-inserting the compliance audit record generation code into the modified program instructions, wherein the event is an event for saving or storing the modified program instructions for a later use.

11. A computer program product comprising a non-transitory computer recordable medium having a computer readable program recorded thereon, wherein the computer readable program, when executed on a computing device, causes the computing device to:

analyze program instructions of an application to identify at least one portion of program instructions matching a compliance policy requirement for generation of a compliance audit record;

generate compliance audit record generation code for generating the compliance audit record;

insert the compliance audit record generation code into the at least one portion of code to generate modified code; and output the modified code for execution on a computing device.

12. The computer program product of claim 11, wherein the computer readable program further causes the computing device to analyze the code to identify at least one portion of code meeting a compliance policy requirement by:

tagging one or more elements within the code with corresponding compliance labels based on identifying elements in the code that match compliance labels in a compliance label metadata database;

correlating the compliance labels with one or more policies in a policy database; and determining if compliance audit record generation code should be inserted into the at least one portion of code based on the correlation of the compliance labels with the one or more policies in the policy database.

13. The computer program product of claim 12, wherein the compliance labels specify an action group with which a group of element keywords are associated.

14. The computer program product of claim 12, wherein the one or more elements include at least one of variables, data elements, objects, methods, or library functions.

15. The computer program product of claim 12, wherein the compliance labels include labels that specify at least one of an audit sensitivity or a audit trigger level.

16. The computer program product of claim 12, wherein the computer readable program further causes the computing device to insert the compliance audit record generation code into the at least one portion of code by:

prompting a user to confirm agreement with insertion of the compliance audit record generation code into the at least one portion of code;

receiving user input in response to the prompt; and inserting the compliance audit record generation code into the at least one portion of program instructions if the user input indicates agreement of the user with the insertion of the compliance audit record generation code into the at least one portion of program instructions.

17. The computer program product of claim 16, wherein the computer readable program further causes the computing device to prompt the user by displaying a graphical user interface specifying information about an element within the at least one portion of program instructions whose associated compliance label correlates with a policy in the policy database indicating that compliance audit record generation code should be inserted.

18. The computer program product of claim 17, wherein the graphical user interface specifies information about the element, the policy, and a sensitivity level label associated with the element, and provides a user input interface through which a user may indicate agreement or non-agreement with the insertion of the compliance audit record generation code in the at least one portion of program instructions.

19. The computer program product of claim 16, wherein if the user input indicates non-agreement with the insertion of the compliance audit record generation code into the at least one portion of program instructions, a notification of the user's non-agreement is generated and either transmitted to another user or is logged in a database.

20. The computer program product of claim 11, further comprising:
   receiving user input to remove the compliance audit record generation code from the modified program instructions; and
   upon occurrence of an event for saving or storing the modified program instructions for later use, automatically re-inserting the compliance audit record generation code into the modified program instructions without notifying the user, wherein the event is an event for saving or storing the modified program instructions for a later use.

21. An apparatus, comprising:
   a processor; and
   a memory coupled to the processor, wherein the memory comprises instructions which, when executed by the processor, cause the processor to:
   analyze program instructions of an application to identify at least one portion of program instructions matching a compliance policy requirement for generation of a compliance audit record;
   generate compliance audit record generation code for generating the compliance audit record;
   insert the compliance audit record generation code into the at least one portion of program instructions to generate modified program instructions; and
   output the modified program instructions for execution on a computing device.

22. The method of claim 1, wherein the compliance policy requirement is a requirement of a compliance policy indicating rules to which an organization associated with the data processing system has agreed to adhere.

23. The method of claim 1, wherein the compliance audit record records compliance information indicating a thread that invokes the at least one portion of program instructions, an identifier of an action performed that causes the at least one portion of program instructions to be executed, and temporal information regarding the action that caused the at least one portion of program instructions to be executed.

24. The method of claim 1, wherein analyzing the program instructions to identify at least one portion of program instructions meeting a compliance policy requirement comprises:
   correlating one or more elements within the program instructions with one or more policies in a policy database; and
   determining whether compliance audit record generation code should be inserted into the at least one portion of program instructions based on the correlation of the one or more elements within the program instructions with the one or more policies in the policy database.

25. The method of claim 24, wherein correlating elements within the program instructions with one or more policies in the policy database comprises associating metadata with the one or more elements within the program instructions based on identifying elements in the program instructions that match the metadata in a compliance metadata database, and wherein determining whether compliance audit record generation code should be inserted into the at least one portion of program instructions comprises performing the determination based on a correlation of the metadata with the one or more policies in the policy database.

* * * * *